US012235989B2

(12) United States Patent
Herman et al.

(10) Patent No.: US 12,235,989 B2
(45) Date of Patent: Feb. 25, 2025

(54) OCCUPANT FEATURE RECOGNITION TO ENSURE PRIVACY CONSENT

(71) Applicant: FORD GLOBAL TECHNOLOGIES, LLC, Dearborn, MI (US)

(72) Inventors: David Michael Herman, Oak Park, MI (US); Yashanshu Jain, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 17/220,347

(22) Filed: Apr. 1, 2021

(65) Prior Publication Data
US 2022/0318425 A1   Oct. 6, 2022

(51) Int. Cl.
*G06F 21/62* (2013.01)
*G06F 21/31* (2013.01)
*G06F 21/32* (2013.01)
*G07C 5/00* (2006.01)
*G07C 5/08* (2006.01)

(52) U.S. Cl.
CPC ........ *G06F 21/6245* (2013.01); *G06F 21/316* (2013.01); *G06F 21/32* (2013.01); *G07C 5/008* (2013.01); *G07C 5/0808* (2013.01); *G06F 21/31* (2013.01); *G06F 21/62* (2013.01)

(58) Field of Classification Search
CPC .... G06F 21/6245; G06F 21/316; G06F 21/32; G07C 5/008; G07C 5/0808
See application file for complete search history.

(56) References Cited

U.S. PATENT DOCUMENTS

| | | | |
|---|---|---|---|
| 8,744,642 B2 | 6/2014 | Nemat-Nasser et al. |
| 8,880,291 B2 | 11/2014 | Hampiholi |
| 9,286,482 B1 | 3/2016 | Dumont et al. |
| 9,663,112 B2 | 5/2017 | Abou-Nasr et al. |
| 10,414,377 B2 | 9/2019 | Hoyos et al. |

(Continued)

FOREIGN PATENT DOCUMENTS

EP   3714422 A1   9/2020

OTHER PUBLICATIONS

Morano, Francesco; Ferretti, Claudio; Leporati, Alberto; Napoletano, Paolo; Schettini, Raimondo; "A blockchain technology for protection and probative value preservation of vehicle driver data," IEEE, 23rd International Symposium on Consumer Technologies (ISCT), Ancona, Italy, 2019, pp. 167-172.*

(Continued)

*Primary Examiner* — Victor Lesniewski
(74) *Attorney, Agent, or Firm* — Frank Lollo; Brooks Kushman P.C.

(57) ABSTRACT

Ensuring privacy consent for handling of occupant vehicle data is provided. A feature identification vector indicative of an identity of a vehicle occupant of a vehicle is identified. The feature identification vector is used to identify whether consent for use of vehicle data was provided by the vehicle occupant. The consent is requested responsive to the identity of the vehicle occupant not having consented to data collection. Responsive to the consent being given by the vehicle occupant, the consent and the feature identification vector of the vehicle occupant is stored in a storage of the vehicle. The vehicle data is uploaded in accordance with whether the consent was granted for the vehicle occupant.

24 Claims, 6 Drawing Sheets

(56) References Cited

U.S. PATENT DOCUMENTS

| | | | |
|---|---|---|---|
| 2004/0267410 A1* | 12/2004 | Duri | H04L 63/20 |
| | | | 701/1 |
| 2009/0150023 A1* | 6/2009 | Grau | G07C 5/008 |
| | | | 455/466 |
| 2011/0196571 A1* | 8/2011 | Foladare | G08G 1/207 |
| | | | 701/31.4 |
| 2014/0106820 A1* | 4/2014 | Toupin | H04M 1/2749 |
| | | | 455/564 |
| 2015/0052619 A1* | 2/2015 | Kwak | G06F 21/6245 |
| | | | 726/28 |
| 2015/0091713 A1 | 4/2015 | Kohlenberg et al. | |
| 2017/0046528 A1* | 2/2017 | Lambert | H04N 9/8205 |
| 2017/0142556 A1* | 5/2017 | Matus | H04W 4/40 |
| 2018/0060954 A1* | 3/2018 | Yin | H04W 88/02 |
| 2018/0061150 A1* | 3/2018 | Harish | G01C 21/10 |
| 2018/0137264 A1* | 5/2018 | Kurian | H04L 67/12 |
| 2019/0034602 A1 | 1/2019 | Votaw et al. | |
| 2019/0340423 A1* | 11/2019 | Kim | G06V 40/165 |
| 2019/0391581 A1* | 12/2019 | Vardaro | A61B 5/02055 |
| 2019/0392107 A1* | 12/2019 | Ricci | G06F 21/31 |
| 2020/0098049 A1 | 3/2020 | Jack et al. | |
| 2020/0265655 A1* | 8/2020 | Ha | G06Q 10/20 |
| 2022/0021660 A1* | 1/2022 | Trieflinger | H04L 63/0414 |
| 2022/0050925 A1* | 2/2022 | Gyllenram | G06Q 50/18 |
| 2022/0138667 A1* | 5/2022 | Cain, Jr. | G06F 21/6245 |
| | | | 705/330 |
| 2022/0169258 A1* | 6/2022 | Samarthyam | H04L 67/12 |
| 2022/0198842 A1* | 6/2022 | Agarwal | G07C 5/0808 |
| 2022/0262169 A1* | 8/2022 | Iqbal | G07C 5/008 |

OTHER PUBLICATIONS

Lee, Sang-Oun; Jung, Hyunseok; Han, Bosuk; "Security Assured Vehicle Data Collection Platform by Blockchain: Service Provider's Perspective," IEEE, 21st International Conference on Advanced Communication Technology (ICACT), PyeongChang, Korea (South), 2019, pp. 265-268.*

* cited by examiner

| Event | Action |
|---|---|
| DTC Event | Send Data |
| Occupant Requests Vehicle Location | Send Location |
| Occupant Requests Vehicle Data | Send Data |
| Key on/off | Do not send Data |
| Vehicle Analytics Event | Do not send Data |
| Media Analytics Event | Do not send Data |
| Speech Recognition Event | Do not send Data |
| Remote Diagnostic Request | Send Data |

OCCUPANT FEATURE RECOGNITION TO ENSURE PRIVACY CONSENT

TECHNICAL FIELD

Aspects of the disclosure relate to occupant feature recognition to ensure privacy consent for the handling of occupant data.

BACKGROUND

Personally identifiable information (PII) includes various forms of information that could identify a human being. PII may include textual information such as names, addresses, and birth dates. PII may include other information as well, such as photographs of people, houses, or license plates. Data analytics may require the use of large sets of collected data. These data sets may include PII.

SUMMARY

In a first illustrative embodiment, a vehicle for ensuring privacy consent for handling of occupant vehicle data is provided. A storage maintains an identity database. A controller is programmed to identify a feature identification vector indicative of an identity of a vehicle occupant, query, using the feature identification vector, to identify the identity of the vehicle occupant, request consent for use of vehicle data responsive to the identity of the vehicle occupant not being indicated by the query as having consented to data collection, and upload vehicle data in accordance with whether the consent was granted for the vehicle occupant.

In a second illustrative embodiment, a method for ensuring privacy consent for handling of occupant vehicle data is provided. A feature identification vector indicative of an identity of a vehicle occupant of a vehicle is identified. The feature identification vector is used to identify whether consent for use of vehicle data was provided by the vehicle occupant. The consent is requested responsive to the identity of the vehicle occupant not having consented to data collection. Responsive to the consent being given by the vehicle occupant, the consent and the feature identification vector of the vehicle occupant is stored in a storage of the vehicle. The vehicle data is uploaded in accordance with whether the consent was granted for the vehicle occupant.

In a third illustrative embodiment, a non-transitory computer-readable medium comprising instructions for ensuring privacy consent for handling of occupant vehicle data that, when executed by a processor of a controller of a vehicle, cause the vehicle to identify a feature identification vector indicative of an identity of a vehicle occupant of a vehicle; use the feature identification vector to identify whether consent for use of vehicle data was provided by the vehicle occupant; request the consent responsive to the identity of the vehicle occupant not having consented to data collection; responsive to the consent being given by the vehicle occupant, store the consent and the feature identification vector of the vehicle occupant in a storage of the vehicle; and upload the vehicle data in accordance with whether the consent was granted for the vehicle occupant.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicle sensors, such as cameras, may acquire both PII data and non-PII data. In an example, vehicles are increasingly being equipped with in-cabin cameras (e.g., for driver state monitoring). These cameras may capture PII of vehicle occupants. Vehicle sensors may also capture location information and driver behavior, which also could be tied to a user.

It may be beneficial to collect such data to develop and debug driver assistance or autonomous driving vehicle systems. For some events, it may be helpful to have the vehicle share data recorder data to a cloud service for debugging of the vehicle systems. However, this sharing may raise PII and/or privacy issues if the collection is performed without the consent of the vehicle occupants. For instance, the transfer of this data may create compliance burdens with General Data Protection Regulation (GDPR) or other privacy laws.

A feature identification vector may be stored on the vehicle and associated with an occupant account. In one example, the feature identification vector may be a facial identification vector determined using an in-vehicle camera. In another example, the feature identification vector may include other information, such as a combination of various driver behavior data.

The vehicle may utilize the feature identification vector to identify an occupant of the vehicle. The identification of the occupant may be performed upon vehicle startup in an example. The identification may allow the vehicle to identify an account corresponding to the occupant. The account may include privacy settings corresponding to the occupant, which may be applicable to the occupant's use of the vehicle. Different privacy settings may be set by each occupant. Using the account, the vehicle may determine whether the occupant has authorized the use of data collection for connected vehicle services.

If the occupant has not authorized connected vehicle services, the vehicle may request that the occupant give consent. If consent is not provided, the vehicle will not transmit the vehicle data to the cloud server.

Figure 1:
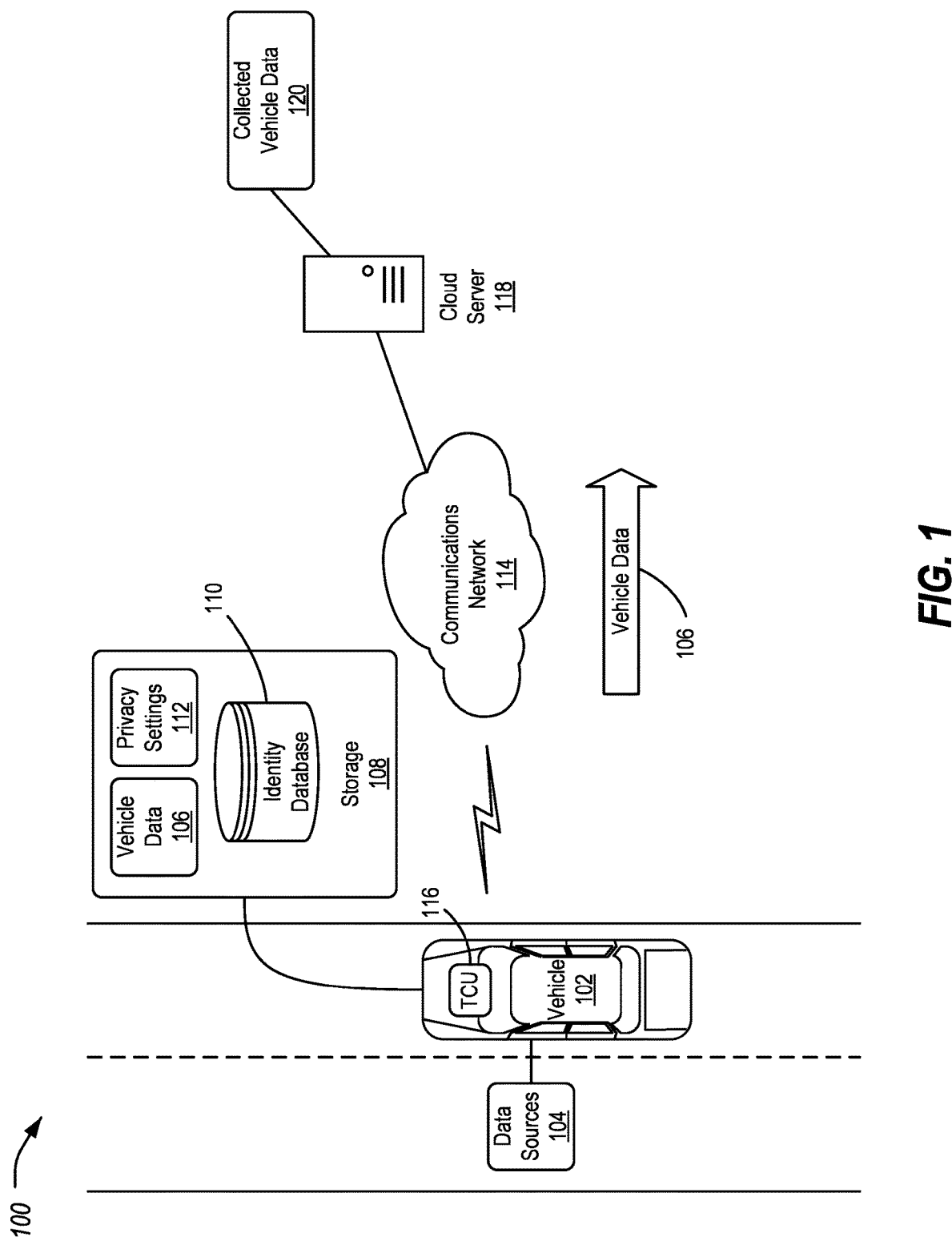
FIG. 1 illustrates an example system for ensuring privacy consent for the handling of occupant vehicle data.

FIG. 1 illustrates an example system 100 for ensuring privacy consent for the handling of occupant vehicle data 106. In such a system, a vehicle 102 may utilize one or more data sources 104 to capture the vehicle data 106. The vehicle 102 may include a storage 108 configured to maintain the vehicle data 106 as well as an identity database 110 and privacy settings 112. The vehicle 102 may also include a telematics control unit (TCU) 116 configured to communicate over a communications network 114 with a cloud server 118. The cloud server 118 may maintain collected vehicle data 120 collected in accordance with privacy settings 112 of the vehicle occupant. The vehicle 102 may further maintain an identity database to identify the privacy settings 112 of the occupant based on an identification of the occupant using the data sources 104. It should be noted that the system 100 is an example, and systems 100 having more, fewer, or different elements may be used. For instance, while one vehicle 102 and one cloud server 118 is shown, it is contemplated that systems 100 could include many vehicles 102, and/or more than one cloud server 118 for load balancing or other networking purposes.

The vehicle 102 may include various types of automobile, crossover utility vehicle (CUV), sport utility vehicle (SUV), truck, recreational vehicle (RV), boat, jeepney, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The data sources 104 may include various devices configured to capture vehicle data 106 of the vehicle 102 environment. In an example, the data sources 104 may include visible light cameras or infrared cameras configured to capture still images and/or video data. In another example, the data sources 104 may include sensors configured to determine three-dimensional (3D) information, such as radar sensors or lidar sensors. The vehicle data 106 may be stored to a database, memory, or other storage 108 of the vehicle 102.

In some instances, the data sources 104 may be configured to capture vehicle data 106 of the surroundings of the vehicle 102. For instance, the data sources 104 may be configured to generate vehicle data 106 of the roadway, of other vehicles 102, of pedestrians, or of obstacles. Some data sources 104 may additionally or alternately be configured to capture vehicle data 106 inside of the vehicle 102, such as of the vehicle 102 cabin. As some other examples, the data sources 104 be configured to generate vehicle data 106 with respect to the location or routing of the vehicle 102. In another example, the data sources 104 may be configured to generate vehicle data 106 with respect to diagnostic codes issued by components of the vehicle 102.

The identity database 110 may include information for identifying the occupants of the vehicle 102. For instance, the identity database 110 may maintain feature identification vectors associated with an occupant account that include information that may be used to identify the occupant. In one example, the feature identification vector may be a facial identification vector including information for, in an example, visually identifying an occupant using an image captured from an in-vehicle camera. In another example, the feature identification vector may include other information, such as a combination of various driver behavior data. The vehicle may utilize the feature identification vectors maintained in the identity database 110 to identify an occupant of the vehicle 102.

The privacy settings 112 may include information indicative of whether the occupant has consented to data collection. The privacy settings 112 may further indicate, if the occupant has consented, what specific elements of data may be offloaded from the vehicle 102 when the occupant is located within the vehicle 102.

The TCU 116 may be configured to provide telematics services to the vehicle 102. These services may include, as some non-limiting possibilities, navigation, turn-by-turn directions, vehicle health reports, local business search, accident reporting, and hands-free calling. The TCU 116 may accordingly be configured to utilize a transceiver to communicate with a communications network 114.

The communications network 114 may provide communications services, such as packet-switched network services (e.g., Internet access, voice over Internet Protocol (VoIP) communication services), to devices connected to the communications network 114. An example of a communications network 114 is a cellular telephone network. For instance, the TCU 116 may access the cellular network via connection to one or more cellular towers. To facilitate the communications over the communications network 114, the TCU 116 may be associated with unique device identifiers (e.g., mobile device numbers (MDNs), Internet protocol (IP) addresses, etc.) to identify the communications of the TCU 116 on the communications network 114 as being associated with the vehicle 102.

The cloud server 118 may be a computing device configured to communicate with the vehicles 102 over the communications network 114. The cloud server 118 may be configured to receive collected vehicle data 120 from the vehicles 102, as well as to allow for controlled access to the collected vehicle data 120. Customers may benefit from the vehicle data 106 being stored on the vehicle 102 or the cloud server 118 but may wish to control who obtains access to the vehicle data 106. There may also be ethical, legal, and regulatory restrictions around the vehicle data 106. For instance, some elements and/or sub-elements of the vehicle data 106 may be allowable or not allowable to a given user under some specific set of circumstances. Control of the vehicle data 106 as it relates to features and customer privacy is therefore desirable.

Figure 2:
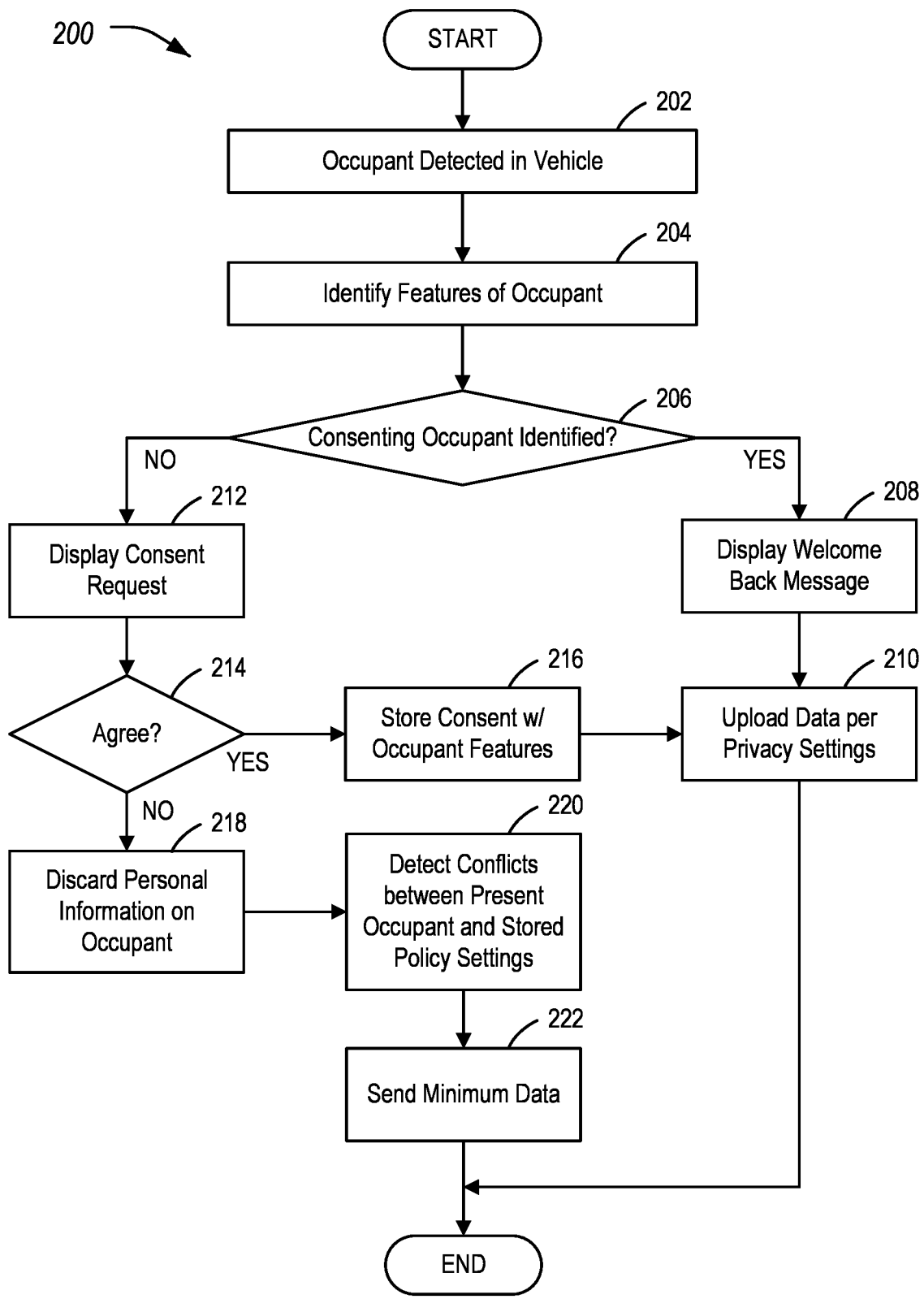
FIG. 2 illustrates an example process for ensuring privacy consent for the handling of occupant vehicle data.

FIG. 2 illustrates an example process 200 for ensuring privacy consent for the handling of occupant vehicle data 106. In an example, the process 200 may be performed by the TCU 116 and/or one or more other controllers of the vehicle 102 in the context of the system 100.

At operation 202, the vehicle 102 detects an occupant. In an example, the vehicle 102 may identify the presence of an occupant using vehicle data 106 from the data sources 104. For instance, the vehicle data 106 may indicate the presence of a vehicle 102 occupant based on data from seat sensors, data from wireless sensors detecting a phone or key, responsive to a door of the vehicle 102 being opened, responsive to receipt of image data from an in-vehicle camera, etc.

At operation 204, the vehicle 102 identifies features of the occupant. In an example, the vehicle 102 creates a feature identification vector as a facial identification vector determined using an in-vehicle camera. An example approach for the creation and use of facial identification vectors is discussed herein with respect to FIG. 5. In another example, the feature identification vector may be generated using other vehicle data 106, such as a combination of various driver behavior data retrieved from the data sources 104.

At operation 206, the vehicle 102 determines whether a consenting occupant is identified. In an example, the vehicle 102 compares the feature identification vector with feature identification vectors of users stored in the identity database 110. This comparison may be performed by determining a distance between the vector of the identified occupant and each of the vectors in the identity database 110. In an example Euclidian distance between the vectors may be determined. If the distance between the vector of the identified occupant and one of the vectors in the identity database 110 is less than a predefined threshold, then the occupant may be a match to that user. A user identifier of that matching user may accordingly be retrieved from the feature identification vectors of the matching user. If the feature identification vector matches to a consenting user in the identity database 110, control passes to operation 208 to display a welcome message. If not, control passes to operation 212 to display a consent request.

At operation 210, the vehicle 102 uploads vehicle data 106 in accordance with the privacy settings 112 of the occupant. In an example, the vehicle 102 access the privacy settings 112 of the user identifier of the consenting user identified at operation 206, and uploads data from the vehicle 102 in accordance with those privacy settings 112. After operation 210, the process 200 ends.

Figures 3, 4:
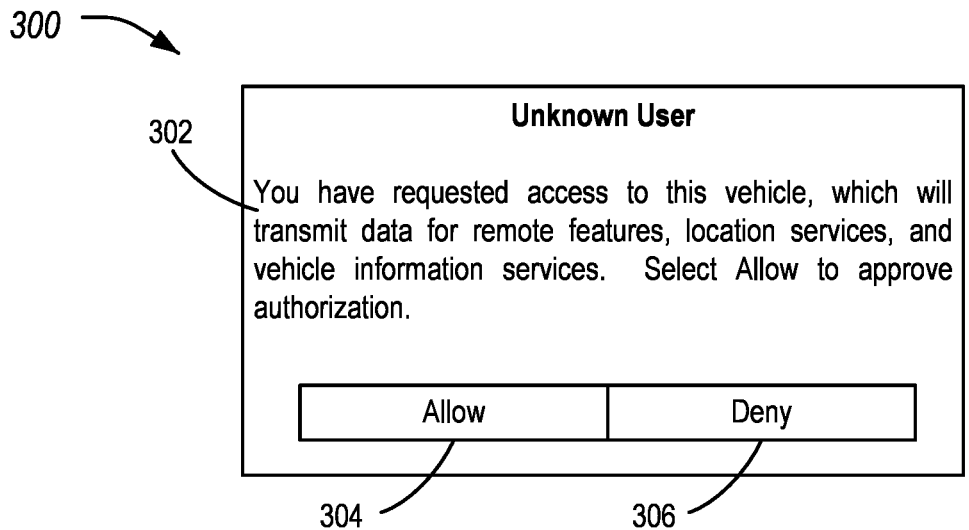
FIG. 3 illustrates an example consent request for receiving privacy consent from a user.
FIG. 4 illustrates an example of privacy settings for use in discarding vehicle data for a vehicle occupant.

At operation 212, the vehicle 102 displays the consent request. An example consent request 300 is illustrated in FIG. 3. As illustrated, the example consent request 300 includes a consent message 302 indicating to the user that the user's consent to upload data off the vehicle 102 is being requested. The consent request 300 further includes an allow control 304 that, when selected by the user, gives the user's consent to upload data off the vehicle 102. The consent request 300 also includes a deny control 306 that, when selected by the user, refuses the user's consent to upload data off the vehicle 102. Responsive to user selection (e.g., via touch input, voice input, button input, etc.) of either the allow control 304 or the deny control 306, the consent request 300 may be dismissed from the vehicle 102 display. If neither the allow control 304 or the deny control 306 is selected within a predefined period of time, then the vehicle 102 may assume that consent was not given.

Referring back to FIG. 2, at operation 214 the vehicle 102 determines whether consent was received. As indicated with respect to the consent request 300, if the user selected the allow control 304, control passes to operation 216. If the use selected the deny control 306 or if no selection was made, control passes to operation 218.

At operation 216, the vehicle 102 stores the consent with the occupant features in the identity database 110. Accordingly, the next time the occupant uses the vehicle 102, the vehicle 102 may recognize that the user has consented (e.g., at operation 206, discussed above) and may proceed with the data collection.

At operation 218, the vehicle 102 discards personal information in the vehicle data 106 with respect to the occupant. This may be done, for example, in accordance with privacy settings 112 of the vehicle occupant.

FIG. 4 illustrates an example of privacy settings 112 for use in discarding vehicle data 106 for a vehicle 102 occupant. As illustrated, the privacy settings 112 includes a listing of events 402 having data upload implications, as well as data processing directives 404 for each of the respective events 402. For instance, for a diagnostic code event 402 raised by a data source 104 in the vehicle 102, a data processing directive 404 to send the diagnostic may be indicated. For a data request of a location event 402 raised by the non-consenting occupant A in the vehicle 102, a data processing directive 404 to send the location request may be indicated. For a data request of another vehicle data 106 event 402 raised by the non-consenting occupant A in the vehicle 102, a data processing directive 404 to send the data request may be indicated. For a remote diagnostic request event 402 sent to the vehicle 102, a data processing directive 404 to send the requested diagnostic data may be indicated. However, for other events, such as vehicle key on or key off events 402, vehicle analytics events 402 with respect to vehicle data 106, media analytics events 402 with respect to consumed media, or speech recognition events 402, the data may be discarded and not uploaded by the vehicle 102.

At operation 220 the vehicle 102 detects conflicts between the present occupant privacy settings 112 and the privacy settings 112 of other users of the vehicle 102. There may be cases where it is reasonable to expect the vehicle 102 to upload vehicle 102 data to the cloud server 118 despite the occupant not having been notified and consented but another user of the vehicle 102 has. In an example, there may be cases where a first user of the vehicle 102 expects access to vehicle data 106 such as a current vehicle location or vehicle diagnostic codes. However, another user of the vehicle who is currently the vehicle occupant may consider such vehicle data 106 to be private, e.g., as it relates to the driving behavior of the occupant. Here, the vehicle 102 may override the privacy settings 112 of one user based on the privacy settings 112 of another user. For instance, if the occupant of the user (e.g., a borrower of the vehicle 102) is of a lower priority than the non-occupant requesting user (e.g., the vehicle 102 owner), then the vehicle 102 may upload the vehicle data 106 as specified in the privacy data table for the higher priority user in case of such a conflict. As another possibility, a fleet owner may have the ability to bypass user consent pursuant to an agreement with employees and/or renters. As an even further possibility, an external authentication method may be used that sends a consent message to the mobile devices of the conflicting users in an attempt to have the conflict waived.

Referring back to FIG. 2, at operation 222 the vehicle 102 sends a minimum of data with respect to any conflicts between occupant lack of consent and data upload needs of the vehicle 102. In an example, the vehicle 102 uses the TCU 116 to upload the data as specified in the privacy settings 112 as determined in operations 218 and 220. After operation 222, the process 200 ends.

Figure 5:
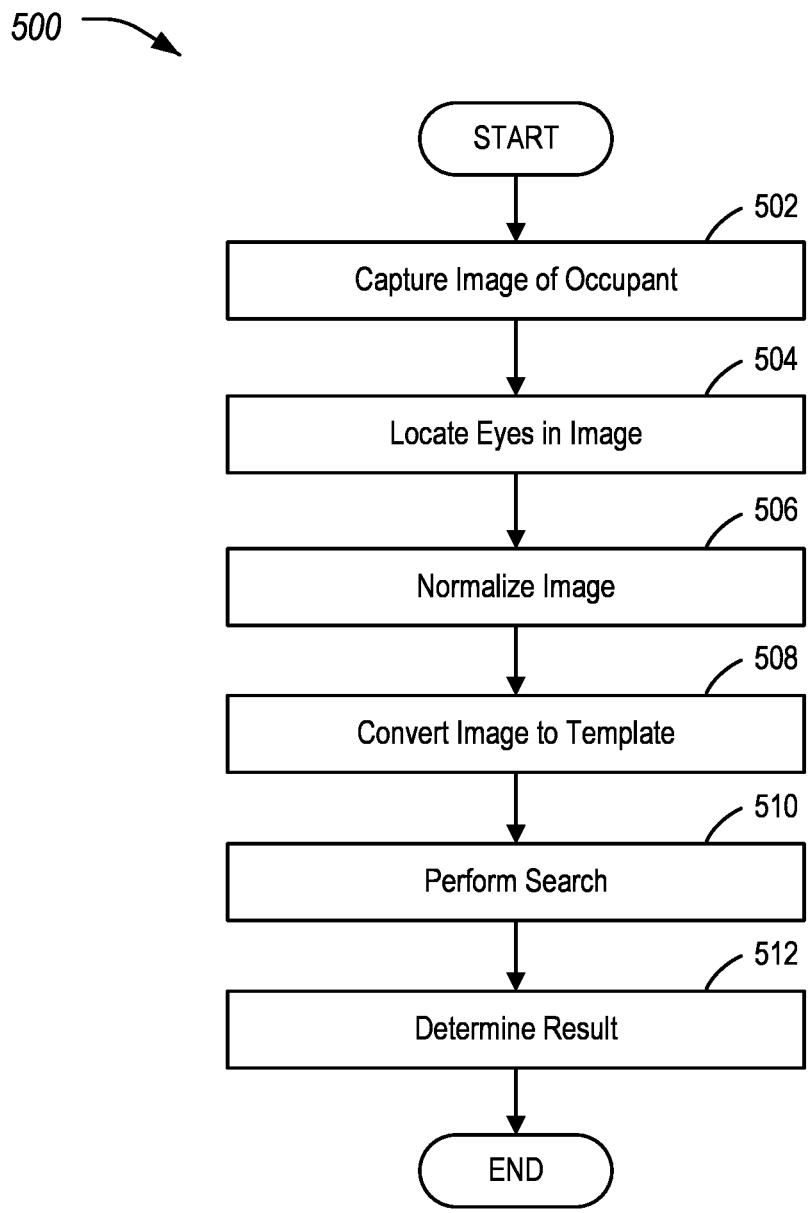
FIG. 5 illustrates an example process for the creation and use of facial identification vectors for the identification of vehicle occupants.

FIG. 5 illustrates an example process 500 for the creation and use of facial identification vectors for the identification of vehicle 102 occupants. As with the process 200, the process 500 may be performed by the TCU 116 and/or one or more other controllers of the vehicle 102 in the context of the system 100.

At operation 502, the vehicle 102 captures an image of the occupant. This may be accomplished using an in-cabin data source 104, such as a camera used to determine driver drowsiness or attentiveness for driver assistance features. In an example, the image may be a head-and-shoulders image.

At operation 504, the vehicle 102 locates eyes in the image. In an example the eyes may be located by first locating a head boundary of the occupant in the image. The eye locations may then be estimated according to average anthropometric measures. The corners of the eyes may then be searched for and detected in the indicated likely region.

At operation 506, the vehicle 102 normalizes the image. For instance, the image may be converted to a common color palate, such as gray scale. In another example, the image may be converted to a common size, such as cropped to a fixed resolution including the occupant's head.

At operation 508, the vehicle 102 converts the image to a template format. This template format may be a vector-based format including key points in the structure of the face. This feature identification vector may be used to facilitate the search of the identity database 110.

At operation 510, the vehicle 102 performs a search for the image using the image. For instance, the vehicle 102 compares the feature identification vector for the captured image with feature identification vectors of users stored in the identity database 110. This comparison may be performed by determining a distance between the vector of the identified occupant and each of the vectors in the identity database 110. In an example Euclidian distance between the vectors may be determined.

At operation 512, the vehicle 102 determines a result with respect to matching the occupant. If the distance between the vector of the identified occupant and one of the vectors in the identity database 110 is less than a predefined threshold, then the occupant may be a match to that user. After operation 512, the process 500 ends.

It should be noted that the use of facial recognition is an example, and in other instances other metrics may be used to determine feature identification vectors to use to identify occupants. For instance, driver behavior data including the occupant's interactions in terms of sequence and timing with the various vehicle 102 controls may be used to generate a feature vector capable of providing driver identification.

Figure 6:
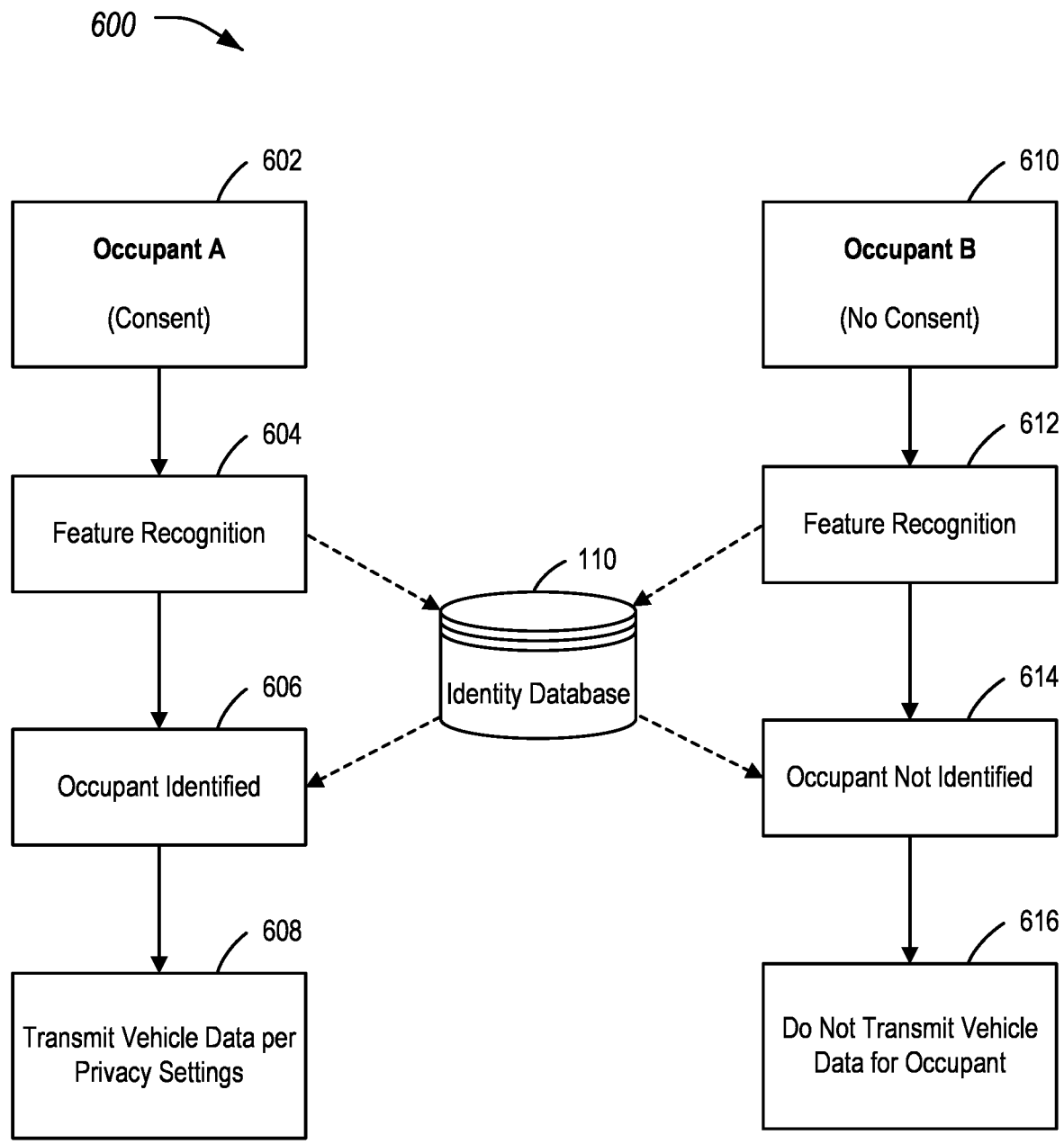
FIG. 6 illustrates an example data flow for the user of the vehicle in accordance with the privacy consent for the handling of occupant vehicle data.

FIG. 6 illustrates an example data flow 600 for the user of the vehicle 102 in accordance with the privacy consent for the handling of occupant vehicle data. As shown, a first occupant 602, referred to as occupant A, consents to data collection. When the first occupant 602 enters the vehicle 102, feature recognition is performed on the first occupant 602 at operation 604, and a lookup is performing using the identity database 110 to determine whether the first occupant 602 has consented to data collection. As this occupant is identified and has consented as shown at 606, at 608 the vehicle 102 transmits vehicle data 106 per the privacy settings 112 of the first occupant 602.

However, in another scenario, a second occupant 610, referred to as occupant B, does not consent to data collection. When the second occupant 610 enters the vehicle 102, feature recognition is performed on the second occupant 610 at operation 612, and a lookup is performing using the identity database 110 to determine whether the second occupant 610 has consented to data collection. As this occupant is identified and has not consented as shown at 614, at 616 the vehicle 102 refrains from transmitting vehicle data 106 per the privacy settings 112 of the second occupant 610.

In some cases, more fine-grained control may be provided. For example, a driver may consent, thereby allowing driver behavior to be transmitted but a passenger setting the radio station may not consent, such that the system would not send data on media analytics or full debug data in case of an infotainment system issue.

Figure 7:
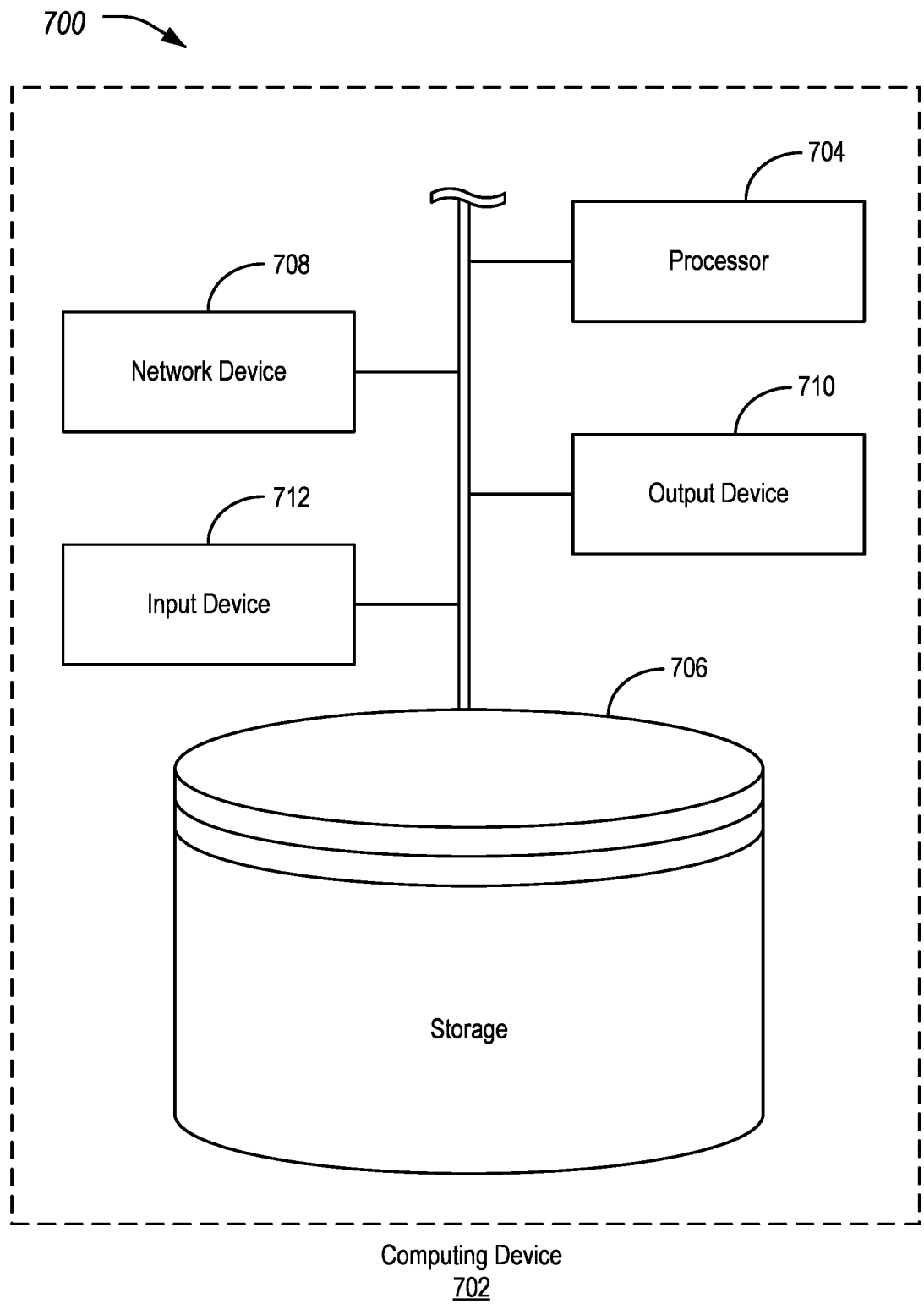
FIG. 7 illustrates an example of a computing device for ensuring privacy consent for the handling of occupant vehicle data.

FIG. 7 illustrates an example 700 of a computing device 702 for ensuring privacy consent for the handling of occupant vehicle data 106. Referring to FIG. 7, and with reference to FIGS. 1-6, the TCU 116 and cloud server 118, may be examples of such computing devices 702. As shown, the computing device 702 includes a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or Microprocessor without Interlocked Pipeline Stage (MIPS) instruction set families.

Regardless of the specifics, during operation the processor 704 executes stored program instructions that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally 3D graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable the TCU 116 and cloud server 118 to send and/or receive data from external devices over networks. Examples of suitable network devices 708 include an Ethernet interface, a Wi-Fi transceiver, a cellular transceiver, or a BLUETOOTH or BLUETOOTH Low Energy (BLE) transceiver, ultra-wideband (UWB) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for ensuring privacy consent for handling of occupant vehicle data, comprising:
    a storage maintaining an identity database including feature identification vectors of vehicle occupants and privacy settings of the vehicle occupants, the privacy settings indicating which of the vehicle occupants have consented to data collection and which specific elements of the vehicle data to be offloaded from the vehicle when the vehicle occupants are located within the vehicle; and
    a controller, programmed to
        identify a first feature identification vector indicative of a first identity of a first vehicle occupant and a second feature identification vector indicative of a second identity of a second vehicle occupant, wherein the first vehicle occupant is a driver and the second vehicle occupant is a passenger,
        query the identity database, using the first and second feature identification vectors, to identify whether consent for use of vehicle data was provided by the first and second vehicle occupants, and
        responsive to the first vehicle occupant but not the second vehicle occupant having provided consent for use of the vehicle data, upload the vehicle data in accordance with the consent granted for the first vehicle occupant but not the second vehicle occupant, including allowing driver behavior to be transmitted but preventing passenger behavior from being transmitted.

2. The vehicle of claim 1, wherein the controller is further programmed to, responsive to the consent being given by the vehicle occupant, store the consent and the feature identification vector of the vehicle occupant in the storage.

3. The vehicle of claim 1, wherein the privacy settings include a listing of events having data upload implications and data processing directives for each of the respective events, and the controller is further programmed to upload the vehicle data for consenting vehicle occupants in accordance with the privacy settings.

4. The vehicle of claim 1, wherein the controller is further programmed to display a welcome message responsive to the identity of the vehicle occupant being indicated in the storage as having granted the consent.

5. The vehicle of claim 1, wherein the feature identification vector is further generated based on interactions, in terms of sequence and timing, of the vehicle occupant with vehicle controls.

6. The vehicle of claim 1, wherein the controller is further programmed to:
    receive a request for a location of the vehicle from another user of the vehicle other than the vehicle occupant; and
    upload the location of the vehicle in accordance with privacy settings of the other user.

7. The vehicle of claim 1, wherein the controller is further programmed to:
    receive a request for diagnostic data; and
    upload the diagnostic data of the vehicle in accordance with privacy settings of a requester of the diagnostic data.

8. The vehicle of claim 1, wherein to request the consent for use of the vehicle data includes to display a consent request, the consent request including a consent message indicating to the vehicle occupant that the consent of the vehicle occupant to upload the vehicle data off the vehicle is being requested, a first control that, when selected by the vehicle occupant, gives the consent of the vehicle occupant to upload the vehicle data off the vehicle, and a second control that, when selected by the vehicle occupant, refuses the consent of the vehicle occupant to upload the vehicle data off the vehicle.

9. The vehicle of claim 8, wherein the controller is further programmed to, responsive to neither the first control nor the second control being selected within a predefined period of time, default to refusal of the consent of the vehicle occupant.

10. The vehicle of claim 8, wherein the controller is further programmed to store the consent with the feature identification vector in the identity database of the storage, such that further times that the vehicle occupant uses the vehicle, the controller of the vehicle is programmed to recognize that the vehicle occupant has consented to proceed with the data collection.

11. The vehicle of claim 1, wherein vehicle data indicative of driver behavior is uploaded, but media analytics and infotainment system data relating to the second vehicle occupant are not uploaded.

12. The vehicle of claim 1, wherein the controller is further programmed to, responsive to both the first vehicle occupant having refused consent for use of the vehicle data and a non-occupant owner of the vehicle requesting the vehicle data, override the privacy settings of the first vehicle occupant to send a minimum of data with respect to this conflict between occupant lack of consent and data upload needs of the vehicle.

13. A method for ensuring privacy consent for handling of occupant vehicle data, comprising:
identifying a first feature identification vector indicative of an identity of a first vehicle occupant of a vehicle;
identifying a second feature identification vector indicative of a second identity of a second vehicle occupant, wherein the first vehicle occupant is a driver and the second vehicle occupant is a passenger;
using the first and second feature identification vectors to identify whether consent for use of vehicle data was provided by the first and second vehicle occupants by querying an identity database; and
responsive to the consent being given by the first vehicle occupant but not by the second vehicle occupant, uploading the vehicle data in accordance with the consent granted for the first vehicle occupant but not the second vehicle occupant, including allowing driver behavior to be transmitted but preventing passenger behavior from being transmitted.

14. The method of claim 13, further comprising:
maintaining privacy settings including a listing of events having data upload implications and data processing directives for each of the respective events; and
uploading the vehicle data for consenting vehicle occupants in accordance with the privacy settings.

15. The method of claim 13, further comprising displaying a welcome message responsive to the identity of the vehicle occupant being indicated in the storage as having granted the consent.

16. The method of claim 13, wherein the feature identification vector includes key points in a structure of a face of the vehicle occupant, and further comprising generating the feature identification vector from an image of the vehicle occupant.

17. The method of claim 13, wherein the feature identification vector is generated based on interactions, in terms of sequence and timing, of the vehicle occupant with vehicle controls.

18. The method of claim 13, further comprising:
receiving a request for a location of the vehicle from another user of the vehicle other than the vehicle occupant; and
uploading the location of the vehicle in accordance with privacy settings of the other user.

19. The method of claim 13, further comprising:
receiving a request for diagnostic data; and
uploading the diagnostic data of the vehicle in accordance with privacy settings of a requester of the diagnostic data.

20. A non-transitory computer-readable medium comprising instructions for ensuring privacy consent for handling of occupant vehicle data that, when executed by a processor of a controller of a vehicle, cause the vehicle to:
identify a first feature identification vector indicative of an identity of a first vehicle occupant of a vehicle and a second feature identification vector indicative of a second identity of a second vehicle occupant, the first and second feature identification vectors each including key points in a structure of a face of the respective vehicle occupant, the first and second feature identification vectors being generated from a respective image of the respective vehicle occupant, wherein the first vehicle occupant is a driver and the second vehicle occupant is a passenger;
use the first and second feature identification vector to identify whether consent for use of vehicle data was provided by the first and second vehicle occupants by querying an identity database, using the first and second feature identification vectors, to identify whether the respective identities of the first and second vehicle occupants are a match to the key points in the structure of the face of a respective one of feature identification vectors stored in the identity database; and
responsive to the consent being given by the first vehicle occupant but not by the second vehicle occupant, upload the vehicle data in accordance with the consent granted for the first vehicle occupant but not the second vehicle occupant, including allowing driver behavior to be transmitted but preventing passenger behavior from being transmitted.

21. The medium of claim 20, further comprising instructions that, when executed by the processor of the controller of the vehicle, cause the vehicle to:
maintain privacy settings including a listing of events having data upload implications and data processing directives for each of the respective events; and
upload the vehicle data for consenting vehicle occupants in accordance with the privacy settings.

22. The medium of claim 20, further comprising instructions that, when executed by the processor of the controller of the vehicle, cause the vehicle to display a welcome message responsive to the identity of the vehicle occupant being indicated in the storage as having granted the consent.

23. The medium of claim 20, wherein one or more of:
the feature identification vector includes key points in a structure of a face of the vehicle occupant, and further comprising instructions that, when executed by the processor of the controller of the vehicle, cause the vehicle to generate the feature identification vector from an image of the vehicle occupant; or
the feature identification vector is generated based on interactions, in terms of sequence and timing, of the vehicle occupant with vehicle controls.

24. The medium of claim 20, further comprising instructions that, when executed by the processor of the controller of the vehicle, cause the vehicle to one or more of:
(i) receive a request for a location of the vehicle from another user of the vehicle other than the vehicle occupant, and upload the location of the vehicle in accordance with privacy settings of the other user, or
(ii) receive a request for diagnostic data, and upload the diagnostic data of the vehicle in accordance with privacy settings of a requester of the diagnostic data.

* * * * *